United States Patent [19]

Mori et al.

[11] 4,110,290

[45] Aug. 29, 1978

[54] PRESSURE-SENSITIVE ADHESIVES

[75] Inventors: Masatoshi Mori; Ryoji Fukata, both of Tokyo, Japan

[73] Assignee: Toyo Ink Manufacturing Co., Ltd., Japan

[21] Appl. No.: 773,008

[22] Filed: Feb. 28, 1977

[30] Foreign Application Priority Data

Jun. 10, 1976 [JP] Japan .................................. 51-67140

[51] Int. Cl.$^2$ ................................................ C09J 3/12
[52] U.S. Cl. ...................... 260/29.6 RW; 260/29.6 H; 260/29.6 TA; 428/520; 428/522
[58] Field of Search .............. 260/29.6 RW, 29.6 TA, 260/29.6 H; 428/520, 522

[56] References Cited

U.S. PATENT DOCUMENTS

| 3,457,209 | 7/1969 | Mickofalvy | 260/29.6 TA |
|---|---|---|---|
| 3,475,363 | 10/1969 | Gander | 260/29.6 H |
| 3,637,428 | 1/1972 | Aleckner, Jr. | 428/516 |
| 3,637,615 | 1/1972 | Coffman | 260/29.6 TA |
| 3,661,696 | 5/1972 | Knutson | 428/520 |
| 3,671,382 | 6/1972 | Pierce | 260/29.6 RW |
| 3,692,723 | 9/1972 | Kasagi et al. | 260/29.6 TA |
| 3,707,518 | 12/1972 | Bemmels et al. | 260/29.6 TA |
| 3,734,819 | 5/1973 | Knutson | 428/520 |
| 3,806,484 | 4/1974 | Dargan | 260/29.6 RW |

*Primary Examiner*—Eugene C. Rzucidlo
*Attorney, Agent, or Firm*—Bucknam and Archer

[57] ABSTRACT

A pressure-sensitive adhesive comprising, by weight, (A) an aqueous dispersion of a copolymer of (1) at least one alkyl acrylate, (2) at least one $\alpha,\beta$-unsaturated carboxylic acid or hydroxyl group-containing acrylate or methacrylate or the like and (3) at least one vinylic or vinylidenic copolymerizable monomer, and (B) an aqueous dispersion of an ethylene-vinyl acetate copolymer.

4 Claims, No Drawings

PRESSURE-SENSITIVE ADHESIVES

This invention relates to a pressure-sensitive adhesive having high bond strength for use in adhesion of something to a film or shaped article made of a polyolefin such as polyethylene, polypropylene or polybutadiene.

Pressure-sensitive adhesives find their use in the preparation of adhesive tapes, labels, stickers, seals or the like. The resulting adhesive products may be applied to plastic, metal, glass, paper, ceramic or like wares and, among others, plastic wares have been increasingly produced. Among the objects made of plastics, those made of a polyolefin have been particularly increasingly produced because of their excellence in safe and sanitary aspects. The polyolefin-made objects include, for example, tableware, containers, toys and packing bags; polybutadiene films have recently be developed and marketed and are now highlighted as material for packing films.

Conventional pressure-sensitive adhesives comprise as main ingredients, natural rubber, a synthetic rubber, a polyvinyl alkyl ether, a polyacrylate or the like, and as subsidiary ingredients, additives such as a tackifier and plasticizer. They are predominently so-called solution-type pressure-sensitive adhesives wherein is used an organic solvent selected from aromatic solvents, esters, ketones and the like, and are excellent in adhesion, applicability, drying property (curability), water resistance and the like. However, attention has recently been drawn to aqueous dispersible pressure-sensitive adhesives from the view-point of economy of resources, freedom of environmental pollution, safety and sanitation. Among said aqueous dispersible pressure-sensitive adhesives, those containing an acrylate copolymer as the main ingredient have been intensively studied with the result that remarkably improved ones are now obtainable and will hereafter be in increasing demand. As compared with the solvent-type pressure-sensitive adhesives, the aqueous dispersible pressure-sensitive adhesives are unsatisfactory in water resistance, bond strength, drying property (curability), stability and the like and efforts have been made to improve the strength of bond to films made particularly of a polyolefin.

The primary object of this invention is to provide pressure-sensitive adhesives which eliminate the disadvantage of unsatisfactory bond strength as experienced with the aqueous dispersible pressure-sensitive adhesives containing the conventional acrylate copolymer as the main component and are excellent in strength of bond to films and other shaped articles made of a polyolefin such as polyethylene, polypropylene or polybutadiene.

In an attempt to obtain pressure-sensitive adhesives which have high bond strength and may be used without environmental pollution and the like, the present inventors had made intensive studies and, as a result of their studies, they have found that an acrylate copolymer will be remarkably enhanced in adhesiveness to polyolefin films and shaped articles by mixing the copolymer with an ethylene-vinyl acetate copolymer. This invention is based on this finding or discovery.

The pressure-sensitive adhesives obtained according to this invention are considered very useful and promising from the view-point of economy of resources, freedom of environmental pollution, safety and sanitation as well as the recent increase in amount of polyolefinic articles to be bonded to other ones with aid of the pressure-sensitive adhesive.

The pressure-sensitive adhesive of this invention comprises, by weight,
  (A) 60 – 95 parts as solid matter of an aqueous copolymer dispersion obtained by emulsion polymerizing in water a mixture of the following monomers (1), (2) and (3):
    (1) 60 – 99 parts of at least one monomeric acrylate having a $C_4$ – $C_{12}$ alkyl group,
    (2) 1 – 7 parts of at least one monomer selected from the group consisting of $\alpha,\beta$-unsaturated carboxylic acids, acrylate and methacrylate having a hydroxyl group, acrylamide and derivatives thereof, each monomer being copolymerizable with the monomer (1), and
    (3) 0 – 39 parts of at least one monomer selected from the group consisting of vinylic copolymerizable monomers other than the monomers (1) and (2), and vinylidene copolymerizable monomers and
  (B) 5 – 40 parts as solid matter of an aqueous dispersion of an ethylene-vinyl acetate copolymer (hereinafter referred to as "EVA").

The aqueous copolymer dispersions (A) and (B) may preferably be a 30 – 60% dispersion and a 40 – 60% dispersion, respectively.

The acrylates having a $C_4$ – $C_{12}$ alkyl group which may be used in this invention include esters of acrylic acid with a straight- or branched-chain aliphatic alcohol, such as butyl acrylate, hexyl acrylate, octyl acrylate and 2-ethylhexyl acrylate. These esters may be used singly or jointly and may be used in an amount by weight at 60 – 99 parts, preferably 80 – 95 parts, in the preparation of the aqueous dispersion (A).

The $\alpha,\beta$-unsaturated carboxylic acids used herein include acrylic, methacrylic, crotonic, itaconic, maleic and fumaric acids. The acrylates and meethacrylates used herein include $\beta$-hydroxyethyl acrylate, $\beta$-hydroxypropyl acrylate, $\beta$-hydroxyethyl methacrylate and $\beta$-hydroxpropyl methacrylate. The acrylamide and the derivatives thereof include N-methylolacrylamide and N-butoxymethylacrylamide; these monomers may be used in an amount by weight of 1 – 7 parts.

The other vinylic and vinylidenic copolymerizable monomers include alkyl acrylates wherein the alkyl has not more than three carbon atoms, such as methyl acrylate, ethyl acrylate, propyl acrylate, alkyl methacrylates having a $C_1$ – $C_4$ alkyl group, vinyl acetate, styrene and acrylonitrile.

Emulsifiers which may be used in the emulsion polymerization of a mixture of the monomers (1) – (3) according to this invention, include polyoxyethylene alkylphenol ether sulfates or sulfonates, alkylbenzene sulfonates and $\alpha$-olefin sulfonates; these monomers may be used singly or jointly with a polyoxyethylene alkylphenol ether, polyoxyethylene stearate, polyoxyethylene and polyoxypropylene block copolymer.

Polymerization initiators used herein include persulfates such as ammonium persulfate, potassium persulfate and sodium persulfate and sodium persulfate, and perioxides such as persulfuric acid, hydrogen peroxide and cumene hydroperoxide; if desired, these initiators may also be used jointly with a reducing agent such as sodium thiosulfate, ethylsorbic acid or ferrous ammonium sulfate, for redox polymerization. In the polymerization according to this invention, dedecyl mercaptan and other mercaptans may further be used as a polymerization controller.

The pressure-sensitive adhesives of this invention are those which are remarkably improved, without a decrease in adhesiveness thereof, in strength of bond to articles such as films and shaped bodies made of polyolefin by incorporating the aqueous dispersion (A) mainly comprising the at least one alkyl acrylate (1) with the aqueous dispersion (B) of EVA. According to this invention, 60 - 95 parts by weight as solid matter of the aqueous dispersion (A) of the copolymer mainly comprising the units derived from the at least one alkyl acrylate may be incorporated with preferably 5 - 40, more preferably 10 - 30, parts by weight of the aqueous dispersion (B) as solid matter of EVA. The incorporation with less than 5 parts by weight as solid matter of the aqueous dispersion (B) of EVA will result in a decrease of the resulting adhesive in not only strength of bond to articles made of polyolefin but also cohesion, while the incorporation with more than 40 parts by weight as solid matter of the dispersion (B) will result in a decrease of the resulting adhesive in not only adhesiveness but also wetting of to-be-bonded polyolefin-made articles with the adhesive thereby lowering the bond strength thereof.

The aqueous dispersion (B) of EVA used herein may be such that it contains 5 - 25, preferably 15 - 25, parts by weight of ethylene per 100 parts by weight of EVA.

The aqueous dispersions (B) used herein include Sumikaflex 400, 500, 510, 751, 752 and 753 (each being a trademark of, and produced by, Sumitomo Chemical Industrial Co., Ltd., Japan), Denka EVA Tex No. 20, No. 21, No. 30, No. 63, No, 60, No. 70. No. 81, No. 83 and FA-143 (each being a trademark of, and produced by Denki Chemical Industrial Co., Ltd., Japan), and Panflex OM-1010, OM-4000, OM-5000 and OM-5010 (each being a trademark of, and produced by, Kuraray Co., Ltd., Japan). If desired, the pressure-sensitive adhesives of this invention may be incorporated with pigments, plasticizers, tackifiers, protective colloids, thickeners, emulsifiers, anti-foaming agents, antiseptic and anti-molding agents, pH adjusters and the like.

It is required that pressure-sensitive adhesives particularly of an aqueous dispersion type be increased to about 6,000 - 20,000 cps in viscosity prior to being coated. For this purpose, polyacrylates, cellulose, polyvinyl alcohol and the like are useful as a thickener.

The supports on which the pressure-sensitive adhesives of this invention are coated, include paper such as slick paper, art paper, coat paper, foil paper and kraft paper; films such as polyester film, acetate film and polvinyl chloride film; and laminates of the paper and film.

This invention will be better understood by the following Examples and Comparative examples wherein all parts and percentages are by weight unless otherwise specified.

EXAMPLE 1

Preparation of an aqueous dispersion (A) - 1 of a copolymer mainly of an alkyl acrylate according to this invention A reactor vessel provided with a thermometer, stirrer, refluxing condenser and tap funnel was charged with the following:
butyl acrylate — 97 parts
acrylic acid — 3 parts
polyoxyethylene alkylpheonol ether — 5 parts
polyoxyethylene alkylphenol ether sulfate — 5 parts
pure water — 266 parts
to form a mixture which was heated under agitation. When the mixture was raised to 55° C, there was incorporated in it a polymerization initiator (ammonium persulfate) and when temperature was raised to 60° C, there was further incorporated dropwise an emulsion while adding the polymerization initiator gradually thereto over a period of three hours, the emulsion comprising the following:
butyl acrylate — 291 parts
acrylic acid — 9 parts
polyoxyethylene alkylphenol ether — 11 parts
polyoxyethylene alkylphenol ether sulfate — 11 parts
pure water — 186 parts
After the end of the incorporation of this emulsion, the polymerization initiator was further added to the emulsion-incorporated mixture to complete the reaction thereof. The milk-white colored aqueous dispersion so obtained had a solid matter content of 45%, pH of 2.5 and viscosity of 2,000 cps.

Preparation of a pressure-sensitive adhesive to this invention 95 parts as solid matter of the aqueous dispersion (A) - 1 and 5 parts as solid matter of Sumikaflex 400 (produced by Sumitomo Chemical Industrial Co., Ltd., Japan) were mixed together so that a novel pressure-sensitive adhesive was purposed.

Comparative EXAMPLE 1

A comparative pressure-sensitive adhesive consisting only of the aqueous dispersion (A) - 1 obtained in Example 1.

EXAMPLE 2

Preparation of an aqueous dispersion (A) - 2 of a copolymer mainly of an alkyl acrylate according to this invention The following monomers:
2-ethylhexyl acrylate — 93 parts
acrylamide — 7 parts
were subjected to the same emulsion polymerization as in Example 1 thereby obtaining an aqueous dispersion (A) - 2 having a solid matter content of 45%, pH of 2.5 and viscosity of 2,500 cps.

Preparation of a pressure-sensitive adhesive of this invention 75 parts as solid matter of the aqueous dispersion (A) - 2 so obtained were blended with 25 parts as solid matter of Denka EVA Tex No. 81 (produced by Denki Chemical Industrial Co., Ltd.) so that a novel pressure-sensitive adhesive of this invention was obtained.

Comparative EXAMPLE 2

A comparative pressure-sensitive adhesive consisting only of the aqueous dispersion (A) - 2 obtained in Example 2.

EXAMPLE 3

Preparation of an aqueous dispersion (A) - 3 of a copolymer mainly of an alkyl acrylate according to this invention The following monomers:
2-ethylhexyl acrylate — 88 parts
methyl methacrylate — 10 parts
β-hydroxyethyl methacrylate — 2 parts were emulsion polymerized in the same manner as in Example 1 thereby to obtain an aqueous emulsion (A) - 3 having a solid matter content of 45%, pH of 2.5 and viscosity of 1,500 cps.

Preparatin of a pressure-sensitive adhesive of this invention 90 parts as solid matter of the aqueous dispersion (A) - 3 were blended with 10 parts as solid matter of Sumikaflex 510 (produced by Sumitomo Chemical Industrial Co., Ltd.) to prepare a novel pressure-sensitive adhesive of this invention.

Comparative EXAMPLE 2

A comparative pressure-sensitive adhesive consisting only of the aqueous dispersion (A) - 3 obtained in Example 3.

The novel pressure-sensitive adhesive obtained in Examples 1 - 3 and the comparative ones obtained in Comparative examples 1 - 3 were each incorporated with a thickener produced under the trademark of PRIMAL ASE-108 by Rohm & Haas Co.) and ammonia water to increase the viscosity of them to 15,000 - 20,000 cps. Each of the pressure-sensitive adhesives so incorporated was coated in an amount of 25 - 30 g/m$^2$ on art paper and then dried in a hot gas at 100° C thereby to obtain a pressure-sensitive adhesive paper.

Each adhesive paper so obtained was tested for bond strength, cohesive force and the like in accordance with JIS (Japanese Industrial Standard) - Z - 1538 with the result being shown in the following Table.

It is seen from the Table that the adhesive paper of each of Examples 1 - 3 has balanced physical properties and high strength of bond to articles made of polyolefin.

Table

|  |  | Example 1 | Comp. example 1 | Example 2 | Comp. example 2 | Example 3 | Comp. example 3 |
|---|---|---|---|---|---|---|---|
| Strength of bond to | Stainless steel | 1,200 | 1,200 | 1,300 | 1,400 | 1,500 | 1,600 |
|  | polyethylene | 900 | 700 | 900 | 600 | 900 | 650 |
|  | polybutadiene | 950 | 650 | 900 | 500 | 950 | 650 |
| Cohesive force |  | 0 mm | 10 mm | 0 mm | 12 mm | 0 mm | 8 mm |

Note: Comp. example = Comparative example

What is claimed is:

1. An aqueous dispersion of a pressure-sensitive adhesive of improved binding power towards polyolefins comprising, by weight,
   (A) 60 - 95 parts as solid matter of a 30-60% aqueous copolymer dispersion obtained by emulsion polymerization in water of a mixture of the following monomers (1), (2) and (3):
      (1) 60-99 parts of at least one monomeric acylate having a $C_4 - C_{12}$ alkyl group,
      (2) 1 - 7 parts of at least one monomer selected from the group consisting of $\alpha,\beta$-unsaturated carboxylic acids, acrylate and methacrylate containing a hydroxyl group, acrylamide, N-methylolacrylamide and N-butoxymethylacrylamide, each monomer being copolymerizable with the monomer (1), and
      (3) 0 $\propto$ 39 parts of at least one monomer selected from the group consisting of vinylic copolymerizable monomers other than the monomers (1) and (2), and vinylidenic copolymerizable monomers and
   (B) 5 - 40 parts as solid matter of a 40-60% aqueous dispersin of an ethylene-vinyl acetate copolymer.

2. A pressure-sensitive adhesive according to claim 1, wherein the monomeric alkyl acrylate (a) is a member selected from the group consisting of butyl acrylate, hexyl acrylate, octyl acrylate and 2-ethylhexyl acrylate, the $\alpha, \beta$-unsatured carboxylic acids are acrylic, methacrylic, crotonic, itaconic, maleic and fumaric acids; the hydroxyl group-containing acrylates and methacrylates are $\beta$-hydroxyethyl acrylate, $\beta$-hydroxypropyl acrylate, $\beta$-hydroxyethyl methacrylate and $\beta$-hydroxypropyl methacrylate; and the monomer (3) is a member selected from the group consisting of methyl acrylate, ethyl acrylate, propyl acrylate, methyl methacrylate, ethyl methacrylate, propyl methacrylate, vinyl acetate, styrene and acrylonitrile.

3. The aqueous dispersion of the pressure sensitive adhesive according to claim 1 wherein an emulsifier which is polyoxyethylene alkyl phenol ether sulfate, polyoxyethylene alkyl phenol ether sulfonate, an alkyl benzene sulfonate or an $\alpha$-olefin sulfonate or a mixture of one of said emulsifiers with polyoxyethylene alkyl phenol ether, polyoxyethylene stearate, polyoxyethylene or polyoxypropylene is added during said emulsion polymerization.

4. The pressure sensitive adhesive according to claim 1 which additionally contains a thickener to inrease the viscosity to 6,000 to 20,000 centipoises.

* * * * *